United States Patent [19]

Honjo

[11] Patent Number: 5,438,458
[45] Date of Patent: Aug. 1, 1995

[54] DATA REPRODUCING APPARATUS THAT DETECTS POSITIONAL SHIFTS OF A CONTROL HEAD

[75] Inventor: Ryoki Honjo, Tokyo, Japan

[73] Assignee: Sony Corporation, Tokyo, Japan

[21] Appl. No.: 209,879

[22] Filed: Mar. 14, 1994

[30] Foreign Application Priority Data

Mar. 15, 1993 [JP] Japan .................. 5-081293

[51] Int. Cl.[6] .................................. H04N 5/78
[52] U.S. Cl. .................. 360/10.2; 360/77.12
[58] Field of Search ............ 360/10.1, 10.2, 10.3, 360/75, 77.12

[56] References Cited

U.S. PATENT DOCUMENTS

| | | | |
|---|---|---|---|
| 4,225,889 | 9/1980 | Yabu et al. | 360/14.2 |
| 5,184,254 | 2/1993 | Kaneko et al. | 360/10.2 |

*Primary Examiner*—Andrew L. Sniezek
*Attorney, Agent, or Firm*—Jay H. Maioli

[57] ABSTRACT

A data reproducing apparatus capable of detecting easily the position shift of a control head including first position information to discriminate recording tracks recorded on recording tracks formed helically on a tape-shaped recording medium and second position information corresponding to the first position information simultaneously recorded on a recording track formed on the recording medium in a longitudinal direction wherein the data formed on the helical track is reproduced by rotary heads and the data formed on the longitudinal track is reproduced by the control head, and because the position of the control head is detected based on the difference between the first position information and the second position information, the position shift of the control head is detected easily.

6 Claims, 9 Drawing Sheets

DATA REPRODUCING APPARATUS THAT DETECTS POSITIONAL SHIFTS OF A CONTROL HEAD

BACKGROUND OF THE INVENTION

1. Field of the Invention

This invention relates to a data reproducing apparatus and more particularly, is applicable to a data reproducing apparatus having a rotary head and a control head.

2. Description of the Related Art

Heretofore, a data recorder conformed to the ANSI ID-1 format (Third Draft PROPOSED AMERICAN NATIONAL STANDARD 19 mm TYPE ID-1 INSTRUMENTATION DIGITAL CASSETTE FORMAT X386/88-12 project 592-D 1988-03-22) has been provided as a recording/reproducing apparatus for high density recording of information data.

In these data recorders, an error correction coding with product coding format is conducted by using Reed-Solomon code on the information data and these are recorded on the magnetic tape, and transmission errors are detected and corrected at the time of reproduction.

As shown in FIG. 1, this data recorder 1 winds a magnetic tape 3 around a rotary drum 2 which is rotating with the prescribed speed in the direction of an arrow "A" by a capstan 4, and as shown in FIGS. 2A and 2B, recording tracks composed of ID-1 format are formed by rotary heads loaded on the rotary drum 2 and a control head 5. An example of the data recorder is disclosed in the U.S. Pat. No. 5,185,740 which is assigned to the assignee of the present application.

More specifically, in the data recorder 1, annotation track ANN to be recorded with annotation information, control track CTL to be recorded with recording information and time code track TC to be recorded with time code information are formed in the longitudinal direction on the upper and lower ends of the magnetic tape 3 by the control head 5 and simultaneously information data is recorded helically on the magnetic tape 3 by the rotating head loaded on the rotary drum 2 and data tracks TR0, TR1, TR2, TR3, TR0, TR1, ... are formed.

In this event, the data tracks TR are arranged to compose track sets $T_{N-1}$, $T_N$, ... every four data tracks TR0, TR1, TR2, TR3, and track set discrimination information to discriminate track sets $T_{N-1}$, $T_N$, ... are recorded on each data track TR0, TR1, TR2, TR3, and control track CTL. Each data track TR0, TR1, TR2, ... is azimuth recorded alternately and simultaneously one sector per one track is formed.

At this point, each track TR0, TR1, TR2, ..., as shown in FIG. 3A, is comprised of a preamble unit PR, a data recording unit DT and a post recording or postamble unit PS composed of 256 synchronizing blocks $BLK_0$ to $BLK_{255}$, which are arranged from the lower front part to the upper front part of the magnetic tape 3 successively in that order.

As shown in FIG. 3B, in the preamble unit PR, an undefined area UND where data to be written in is not defined, 180 bit length rising sequence RUS, 36 bit length synchronizing code $SYNC_{PR}$, 36 bit length data track discrimination data $ID_{DATA1}$ and 54 bit length auxiliary data $DT_{AUX}$ are arranged successively in that order, and as shown in FIG. 3C, 2 bit track number information $ID_{TR}$ which shows each track number TR0, TR1, TR2, TR3, in each track set and 22 bit track set number information $ID_{SET1}$ which shows the number of track sets $T_{N-1}$, $T_N$, ... are recorded in the track discrimination data $ID_{DATA1}$.

With this arrangement, in the data recorder 1, phase information of the rotary drum 2 can be obtained by reading out the synchronizing code $SYNC_{PR}$, and simultaneously track sets $T_{N-1}$, $T_N$, ... of data tracks whereon the rotary head is scanning and track numbers TR0, TR1, TR2, and TR3 can be detected by reading out the track set number information $ID_{SET1}$ and the track number information $ID_{TR}$, Furthermore, in each synchronizing block $BLK_0$ to $BLK_{255}$ of sequential data recording unit DT, 36 bit length synchronizing code $SYNC_{BLK}$, 9 bit length block discrimination data $ID_{BLK}$, $153 \times 9$ bit length inner data DI and parity code RI composed of 72 bit length Reed Solomon code are successively arranged in that order.

Moreover, in the postamble unit PS, 36 bit length synchronizing code $SYNC_{PS}$ and data track discrimination data $ID_{DATA2}$ are successively arranged.

At this point, as shown in FIG. 4, recording system 1A of the data recorder 1 conducts an error coding of product coding format on the input information data and records this on the magnetic tape 3.

More specifically, in the data recorder 1, input information data $DT_{USE}$ which is composed of 8 bits per 1 byte is inputted to an outer code formation circuit 10. The outer code formation circuit 10 forms a parity code composed of 10 bytes of Reed Solomon code as an outer code in utilizing the prescribed formation polynomial and adds this at the end of the input information data $DT_{USE}$ and outputs to a memory 12 via a first multiplexer 11 as an outer data block DO.

Moreover, in the memory 12, data block discrimination data $ID_B$ generated at the discrimination data generation circuit 13 for discriminating each line of the memory 12 is sent via the first multiplexer 11 and the data written in the memory 12 are read out in accordance with the order of data block discrimination data $ID_B$.

The data read out from the memory 12 is outputted to an inner code formation circuit 14. The inner code formation circuit 14 forms the parity code composed of 8 bytes of Reed Solomon on each data block to be inputted as the inner code in utilizing the prescribed formation polynomial and adds the parity code to the tail of each data block and outputs to the second multiplexer 15 as an inner data block DI.

The second multiplexer 15 successively selects the preamble data PR and the postamble data PS which are formed at the preamble/postamble generation circuit 16 and the inner data block DI composed of the output of the inner code formation circuit 14, and outputs these to a data randomizing circuit 17 in the order of preamble data PR, inner data block DI and postamble data PS.

The data randomizing circuit 17 randomizes data by taking the exclusive OR with the prescribed data on each 1 byte of the data inputted and outputs the randomized data an 8-9 modulation circuit 18.

The 8-9 modulation circuit 18 converts the data composition from 8 bit to 9 bit in order to eliminate the direct current element of a signal waveform to be recorded on the magnetic tape 3. An example of the 8-9 conversion is disclosed in the U.S. Pat. No. 5,192,949 which is assigned to the assignee of the present application.

This conversion is summarized as follows:

More specifically, two kinds of 9 bit data are defined in advance by an ID-1 format regarding each value of 1-byte 8-bit input data having 256 kinds of value. These two kinds of 9 bit data are data having opposite polarity, positive and negative, of CDS (Codeword Digital Sum), and the 8–9 modulation circuit 18 watches DSV (Digital Sum Variation) of 9 bit data to be outputted corresponding to the input data and selects one of two kinds of 9 bit data having different CDS values in order that the value becomes zero. With this arrangement, the 8–9 modulation circuit 18 converts the input data composed of 1 byte 8-bit to the data of DC free 9 bit data. Also, the 8–9 modulation circuit 18 has a circuit which converts the format of input data of NRZL (Nonreturn to Zero Level) to NRZI (Nonreturn to Zero Inverse).

The output the 8–9 modulation circuit 18, i.e., the data composed of 9 bit NRZI is inputted to the third multiplexer 19. This multiplexer 19 forms synchronizing blocks $BLK_0$ to $BLK_{255}$ adding 4 byte length fixed synchronizing codes $SYNC_B$ to be formed in the synchronizing code generation circuit 20 for each data block of the inner data block DI. The code pattern of this synchronizing code $SYNC_B$ is defined by the ID-1 format and it is also defined that the pattern to be recorded on the magnetic tape 3 must hold the format of this code pattern.

The output the third multiplexer 19 is inputted to parallel serial converter 21 which converts each data of the bit parallel composed preamble unit PR, synchronizing blocks $BLK_0$ to $BLK_{255}$ and postamble unit PS to be inputted to the bit serial composed data $S_{REC}$.

This serial data $S_{REC}$, after being amplified at the recording amplifier 22, is supplied to the magnetic head 24 which is helically scanning the magnetic tape 3 for a recording signal and thus, the data tracks TR (..., TR0, TR1, TR2, TR3, ...) are formed on the magnetic tape 3 as shown in FIGS. 2A and 2B. With this arrangement, recording system 1A of the data recorder 1 is able to record the desired information data $DT_{USE}$ by adding error correction codes in conformity with a Reed Solomon product coding format.

Furthermore, the information data $DT_{USE}$ recorded on the magnetic tape 3 by the recording system 1A of the data recorder 1 is reproduced in the reproducing system 1B of the data recorder 1 as shown in FIG. 5.

The reproducing system 1B is arranged to perform the signal processing which is completely contrary that performed by the recording system 1A. More specifically, the reproducing system 1B of the data recorder 1 reads out recording information recorded on the data tracks TR (..., TR0, TR1, TR2, TR3, ...) on the magnetic tape 3 as reproducing signal $S_{PB}$ in utilizing the magnetic head 24 and outputs this to a reproducing amplifier 25.

The reproducing amplifier 25 comprises an equalizer and a binary coding circuit, and performs binary coding on the reproducing signal $S_{PB}$ inputted and outputs to the following serial/parallel converter 26 as reproducing digital data $DT_{PB}$. This serial/parallel converter 26 converts serial format reproducing digital data $DT_{PB}$ to 9 bit parallel data $DT_{PR}$ and outputs this to synchronizing code detection circuit 27.

The synchronizing code detection circuit 27 detects synchronizing codes $SYNC_B$ from a flow of parallel data and discriminates synchronizing codes based on this. Also, the synchronizing code-detection circuit 27 converts NRZI format parallel data $DT_{PR}$ to the NRZL format.

An output of the synchronizing code detection circuit 27 is inputted to the 8-9 demodulator 28. The 8-9 demodulator 28 is composed of ROM (Read Only Memory) and after demodulating the data converted from 8 bit to 9 bit for DC randomizing in the recording system 1A from 9 bit to 8 bit in utilizing the conversion table, outputs to data derandomizing circuit 29.

The data derandomizing circuit 29 derandomizes the restored data by performing an exclusive OR calculation processing in conformity with the data restored to 8 bit and the same fixed data used in randomization at the time of recording.

An inner code error detection correction circuit 30 performs error detection and correction on the inner data block in synchronizing blocks discriminated at the synchronizing code detection circuit 27 in utilizing the 8 byte length inner code added to each block.

Inner data blocks that have received inner code error correction are written in a memory 32 having the same composition as the memory 12 (FIG. 4) of the recording system 1A, based on the block discrimination data $ID_B$ added to each block to be detected by the discrimination data detection circuit 31 as one data block per one line. The writing-in order is the same as those of the reading out order of the recording system 1A of the memory 12.

The data written in the memory 32 is read out by the outer code error detection correction circuit 33 in a similar order to the writing-in order of the recording system 1A and as a result, the outer data block DO can be obtained again. The outer code detection correction circuit 33 performs error detection and correction on the outer data blocks in utilizing the outer code added to each block. Thus, the information data $DT_{USE}$ recorded on the magnetic tape 3 can be reproduced.

In this data recorder 1, as described above in FIGS. 1, 2A and 2B, track sets $T_{N-1}$, $T_N$, ... composed of data tracks TR0, TR1, TR2, and TR3 are formed in a longitudinal direction helically on the magnetic tape 3 by a plurality of rotary heads loaded on the rotary drum 2 and simultaneously control track CTL is formed in a longitudinal direction of the magnetic tape 3 by the control head 5, and the same track set number information $ID_{SET2}$ as the track set number information $ID_{SET1}$ (FIGS. 3A to 3C) recorded on the data tracks TR is recorded on the control track CTL.

With this arrangement, in the data recorder 1, the rotary head loaded on the rotary drum 2 can trace on the data tracks TR wherein the track set number information $ID_{SET1}$ is written in corresponding to the above track set number information $ID_{SET2}$ since the control head 5 reads out the track set number information $ID_{SET2}$ on the control track CTL at the time of fast forwarding or rewinding.

At this point, in the data recorder 1, the track set number information IDSET2 on the control track CTL is recorded on the same position as those of track sets $T_{N-1}$, $T_N$, ... on the corresponding data tracks TR in a longitudinal direction of the tape by recording the track set information $ID_{SET2}$ delayed for the distance difference between the standard point of writing-in and reading-out of the rotary head and the standard point of write-in and read-out of the control head 5 for the track set number information $ID_{SET1}$ on the corresponding data tracks TR.

However, as shown in FIG. 1 in the data recorder 1, there are cases where the position of control head 5 shifts in the direction of B, farther from the rotary drum 2, or closer to the rotary drum 2 in the direction of C.

At this point, in the data recorder 1, in the case where the position of control head 5 shifts for integral multiples of the data track (in the case of an azimuth recording system where it shifts for even number multiples of the data track) since the shift cannot be detected, there has been a problem that recording which does not agree with the format has been conducted.

Therefore, in the conventional data recorder 1, the control head 5 is arranged at the correct position and simultaneously, a method to adjust the phase of the rotary drum has been used by conducting various adjustments such as RF envelope adjustment, position adjustment of the control head and phase adjustment of the drum, observing the RF signal obtained at the time when the above standard tape is reproduced with oscilloscopes, on the basis of a servo reference signal in utilizing an exclusive standard tape at the time of manufacture.

However, in this method it is necessary to have measuring devices such as special standard tapes and oscilloscopes, as well as professional knowledge. Therefore, in practice it was impossible that the user could conduct these adjustments directly.

SUMMARY OF THE INVENTION

In view of the foregoing, an object of this invention is to provide a data reproducing apparatus which is capable of detecting easily the position shift of the control head with a self diagnosis function.

The foregoing object and other objects of the invention have been achieved by the provision of a data reproducing apparatus 40 or 60 in which the first position information $ID_{SET1}$ to discriminate recording tracks TR0, TR1, TR2, and TR3 is recorded on helical recording tracks TR0, TR1, TR2, and TR3 formed successively in a longitudinal direction on a tape shaped recording medium 3 and simultaneously, the second position information $ID_{SET2}$ corresponding to the first position information $ID_{SET1}$ is recorded on the recording track CTL formed in a longitudinal direction, and for reproducing data on helical recording tracks TR0, TR1, TR2, and TR3 by rotary heads and simultaneously for reproducing data on the recording track CTL formed in a longitudinal direction by the control head 5, the position of control head 5 is detected based on the difference between the first position information $ID_{SET1}$ reproduced by the rotary heads and the second position information $ID_{SET2}$ reproduced by the control head 5.

Furthermore, in accordance with this invention, the difference between the first position information $ID_{SET1}$ and the second position information $ID_{SET2}$ is obtained at the timing $T_3$ in synchronism with the prescribed standard signal S11 which changes corresponding to the number and reproducing speed of rotary heads loaded on the rotary drum 2.

In the case where the first position information $ID_{SET1}$ to discriminate the above recording tracks TR0, TR1, TR2, and TR3 recorded on helical recording tracks TR0, TR1, TR2, and TR3, and the second position information $ID_{SET2}$ corresponding to the first position information $ID_{SET1}$ and recorded on the longitudinal track CTL are reproduced by the rotary head and the control head 5 respectively, if the difference of between the first and second position information $ID_{SET1}$ and $ID_{SET2}$ is bigger than the prescribed standard value "62" ID, the position of the control head 5 shifts farther from the rotary drum 2 in the direction of B and if the difference of the first and second position information $ID_{SET1}$ and $ID_{SET2}$ is smaller than the prescribed standard value "62" ID, the position of the control head 5 shifts closer to the rotary drum 2 in the direction of "C". Thus, the position shift of the control head 5 is self diagnosed from the first position information $ID_{SET1}$ reproduced by the rotary head and the second position information $ID_{SET2}$ reproduced by the control head 5.

Furthermore, if the difference between the first position information $ID_{SET1}$ and the second position information $ID_{SET2}$ is obtained at the timing $T_3$ in synchronism with the drum standard signal S11 which changes corresponding to the number and reproducing speed of rotary heads loaded on the rotary drum 2, the position shift of the control head 5 can be detected even in the case where the number of rotary heads varies according to the type of apparatus or the reproducing speed changes.

In accordance with this invention, in a data reproducing apparatus in which the first position information to discriminate recording tracks is recorded on helical recording tracks formed successively in a longitudinal direction on a tape-shaped recording medium and simultaneously the second position information corresponding to the first position information is recorded on another recording track formed in a longitudinal direction, and in which data is reproduced on helically formed recording tracks by rotary heads and simultaneously data is reproduced on recording tracks formed in a longitudinal direction by a control head, since the position of the control head is detected based on the difference between the first position information reproduced by the rotary heads and the second position information reproduced by the control head, the data reproducing apparatus is capable of detecting easily the position shift of the control head by applying a self diagnosis system The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings.

DETAILED DESCRIPTION OF THE EMBODIMENT

Figure 6:
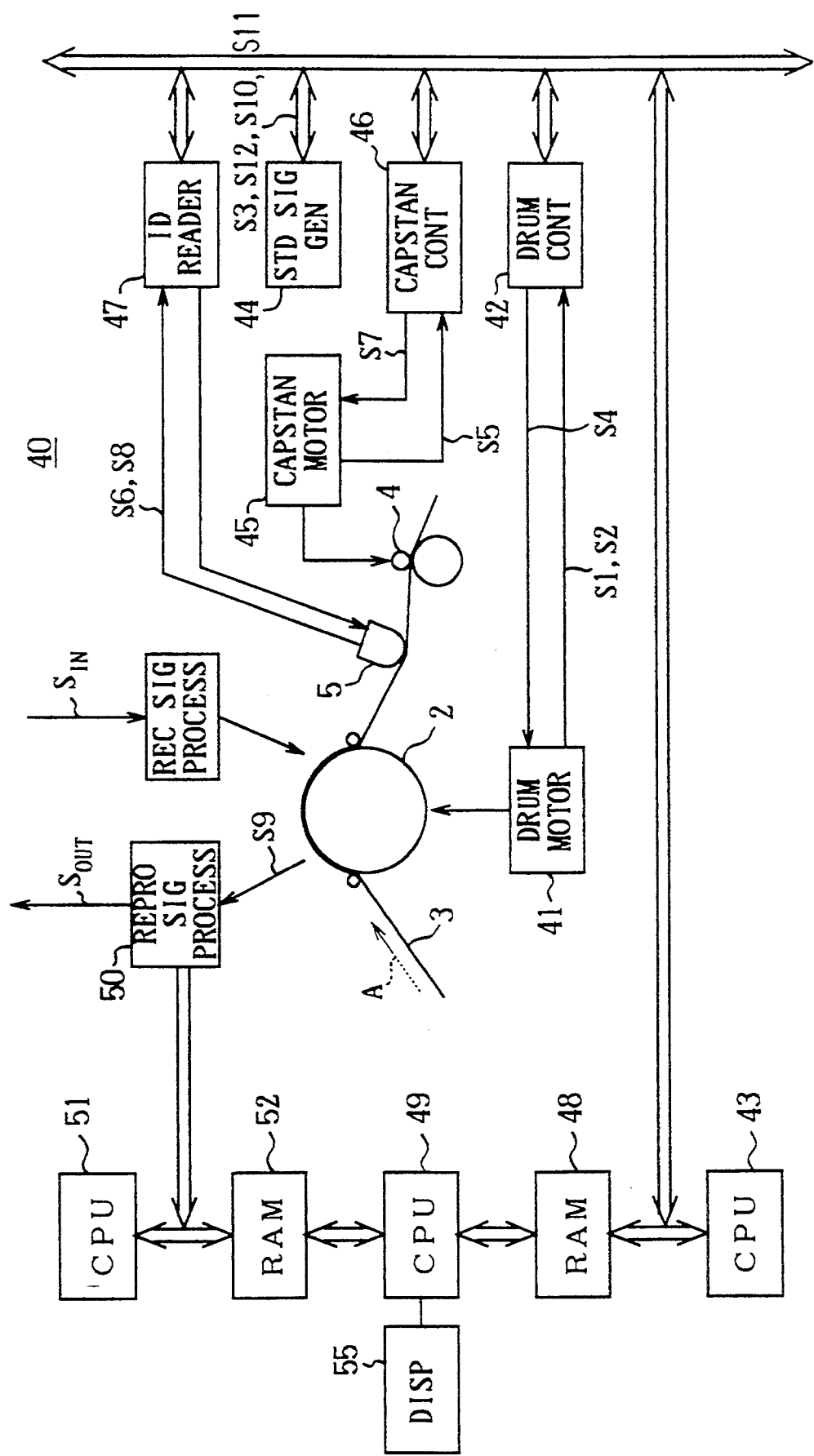
FIG. 6 is a block diagram illustrating one embodiment of a data recorder according to this invention.

Preferred embodiments of this invention will be described with reference to the accompanying drawings:

In FIG. 6, 40 generally shows a data recorder, and in case of detecting the position shift of the control head 5, the magnetic tape 3 recorded with a format in conformity with an ID-1 format is driven by a capstan 4 in the direction marked an arrow A and simultaneously, information recorded on the above magnetic tape 3 is reproduced by plural rotary heads loaded on the rotary drum 2 and the control head 5.

The data recorder 40 outputs a rotating speed signal S1 and a phase information signal S2 from a frequency generator of the drum motor 41 to the first CPU 43 via the drum control unit 42 and simultaneously, by outputting servo reference signal S3 generated by the standard signal generation circuit 44 to the first CPU 43, the above first CPU 43 compares the rotating speed signal S1 and the phase information signal S2 and by outputting the above comparison resultant signal S4 to the drum motor 41 via the drum control unit 42, the drum motor 41 is servo controlled by utilizing a micro computer.

Similarly, the data recorder 40 compares the rotating speed signal S5 outputted from a capstan motor 45 and a reproducing synchronizing signal S6 reproduced by the control head 5, and a servo reference signal S3 generated by the standard signal generation circuit 44 at the first CPU 43, and servo controls the capstan motor 45 by outputting the above comparison resultant signal S7 to the capstan motor 45 via the capstan control unit 46 by utilizing the micro computer.

Furthermore, the control head 5 outputs reproducing control signal S8 from the control track CTL of the magnetic tape 3 to the first CPU 43 via an ID reader circuit 47. At this point, the ID reader circuit 47 detects track set number information $ID_{SET2}$ (FIGS. 2A and 2B) contained in the reproduced control signal S8, and after reading out the above track set number information $ID_{SET2}$ once by the first CPU 43 outputs to the second CPU 49 via a RAM (Random Access Memory) 48 which is composed of common memory.

Moreover, reproducing signal S9 obtained by the rotary head of the rotary drum 2 is outputted via a reproducing signal processing circuit 50 as reproducing data $S_{OUT}$ and simultaneously, is outputted to the third CPU 51.

Figures 3A, 3B, 3C:
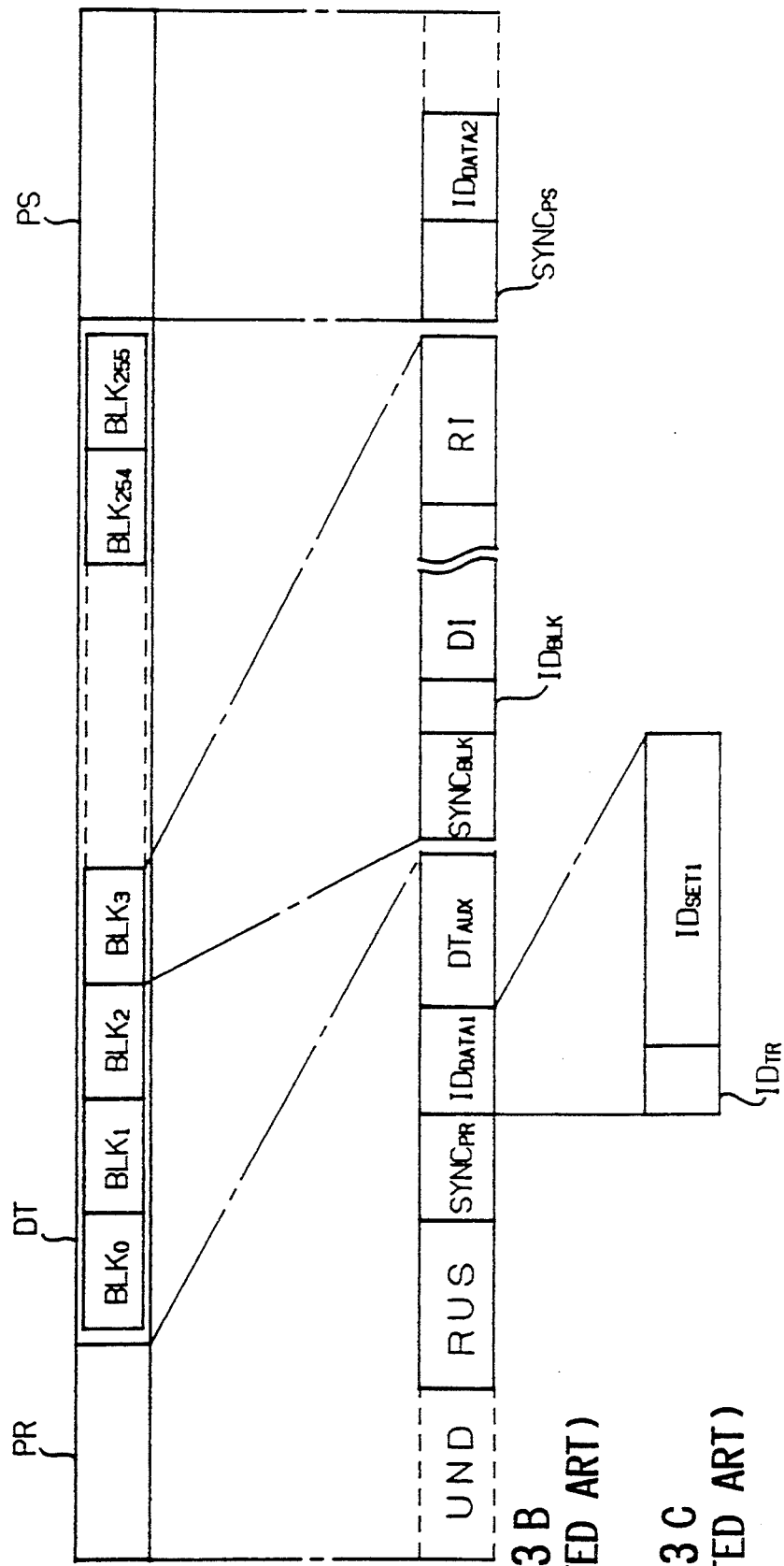
FIGS. 3A to 3C are schematic diagrams showing the contents of the data track in ID-1 format.
Figure 4:
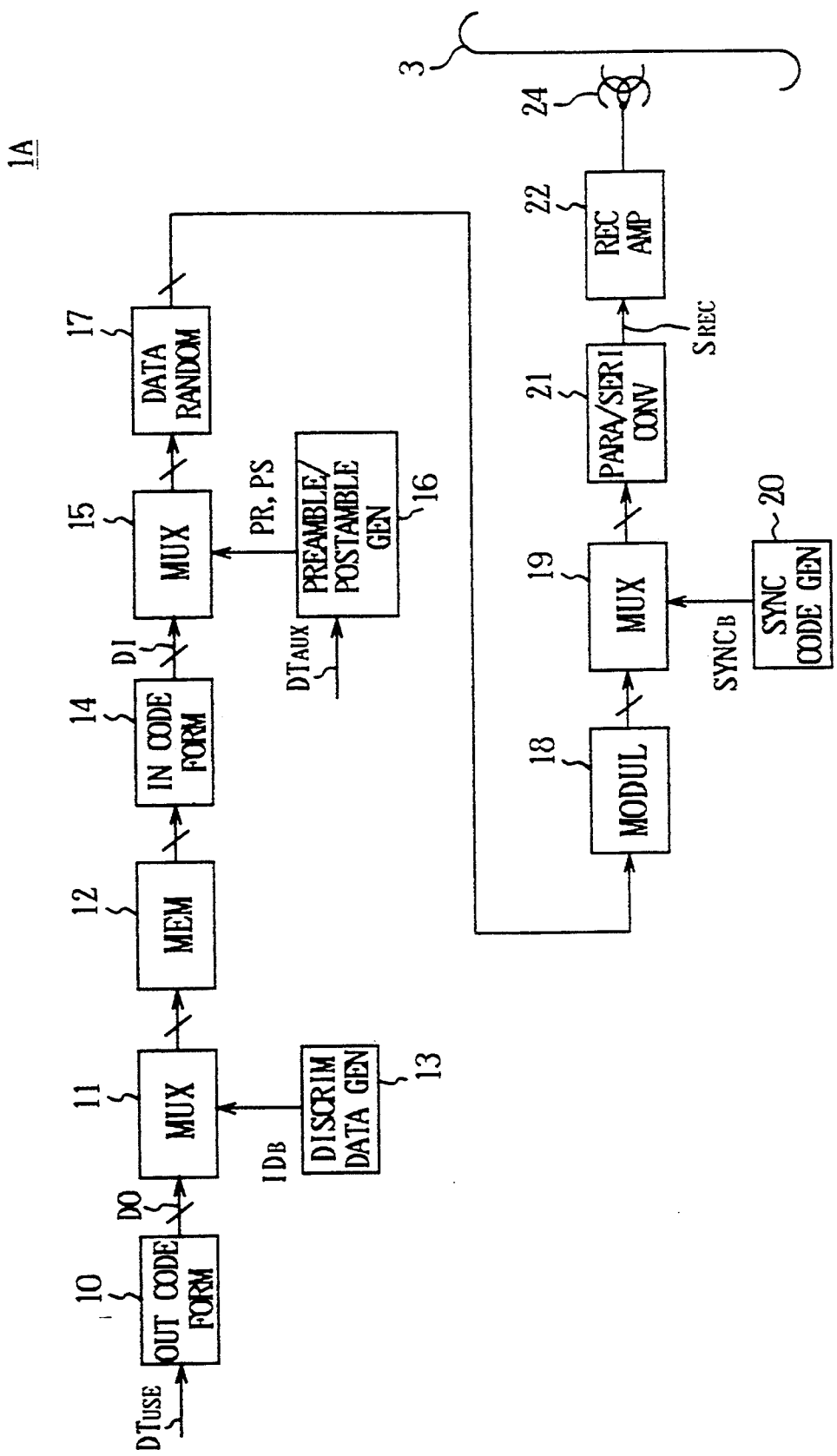
FIG. 4 is a block diagram showing the recording system of an ID-1 format data recorder.
Figure 5:
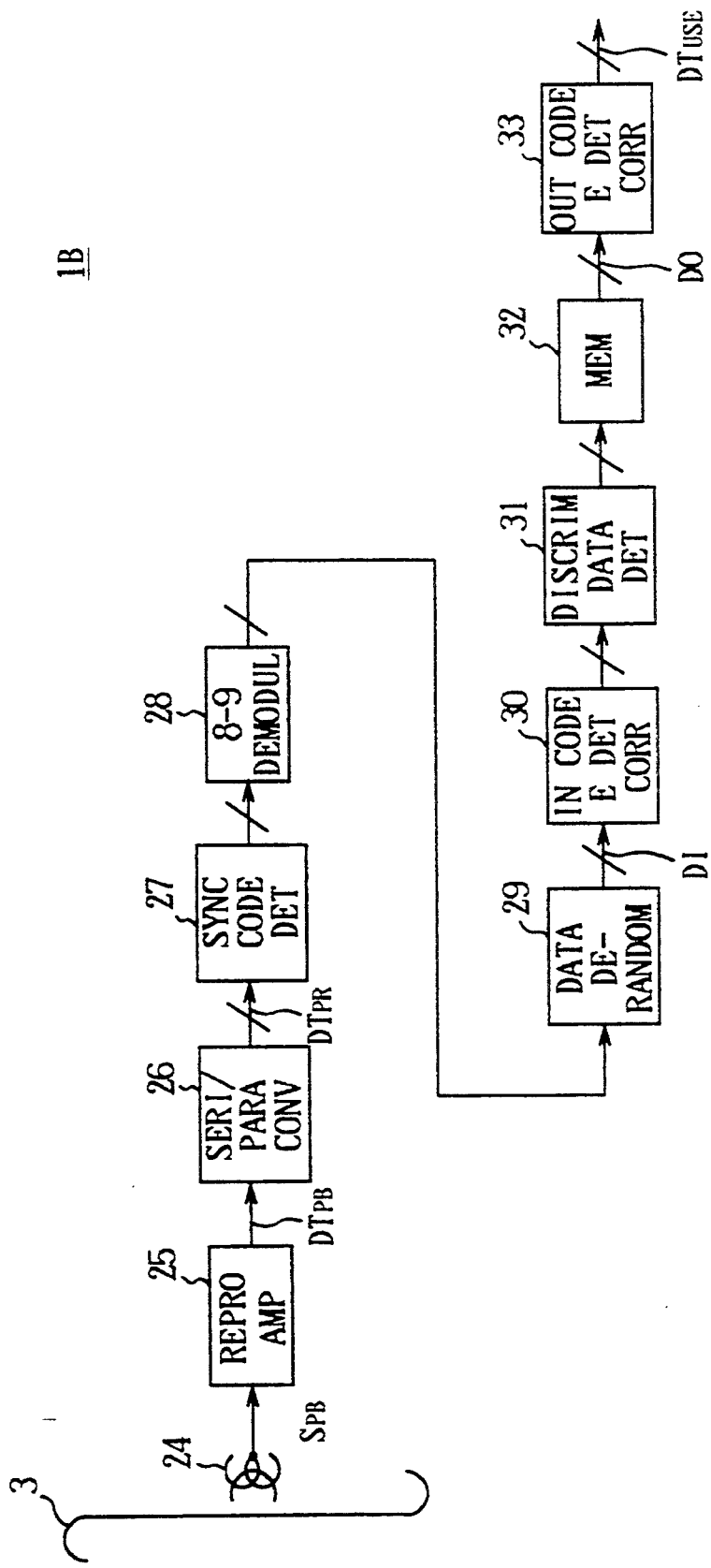
FIG. 5 is a block diagram showing the reproducing system of an ID-1 format data recorder.

The third CPU 51, after reading out data track discrimination data $ID_{DATA1}$ (FIGS. 3A and 3C) contained in reproducing signal S9, outputs this to the second CPU 49 via a common memory RAM 52.

At this point, the second CPU 49 receives track set number information $ID_{SET2}$ on the control track CTL which is outputted from the first CPU 43 and data track discrimination data $ID_{DATA1}$ on the data track TR which is outputted from the third CPU 51 and compares these to each other.

In the case of this embodiment, 8 rotary heads are loaded on the rotary drum 2 of the data recorder 40 and thus, 4 data tracks (i.e., 1 track set) out of data tracks TR (..., TR3, TR0, TR1, TR2, TR3, ...) as described above in FIGS. 2A and 2B, can be reproduced every time the rotary drum 2 makes a half turn.

In the data recorder 40, the difference between the track set number information $ID_{SET2}$ and the data track discrimination data is detected and a message is generated corresponding to the detected result and is displayed on a display device 55 to inform the user.

In the data recorder 40, in the case where the control head 5 is arranged at the correct position, there exists spatial distance for 62 track sets (i.e., for "62" ID) between the writing-in reading-out standard point of the rotary drum 2 and the writing-in reading-out standard point of the control head 5 and thus, in the case where the difference between the track set number information $ID_{SET1}$ and the track set number information $ID_{SET2}$ which are read out at the same timing is "62" ID, the control head 5 is arranged at the correct position.

Figure 7:
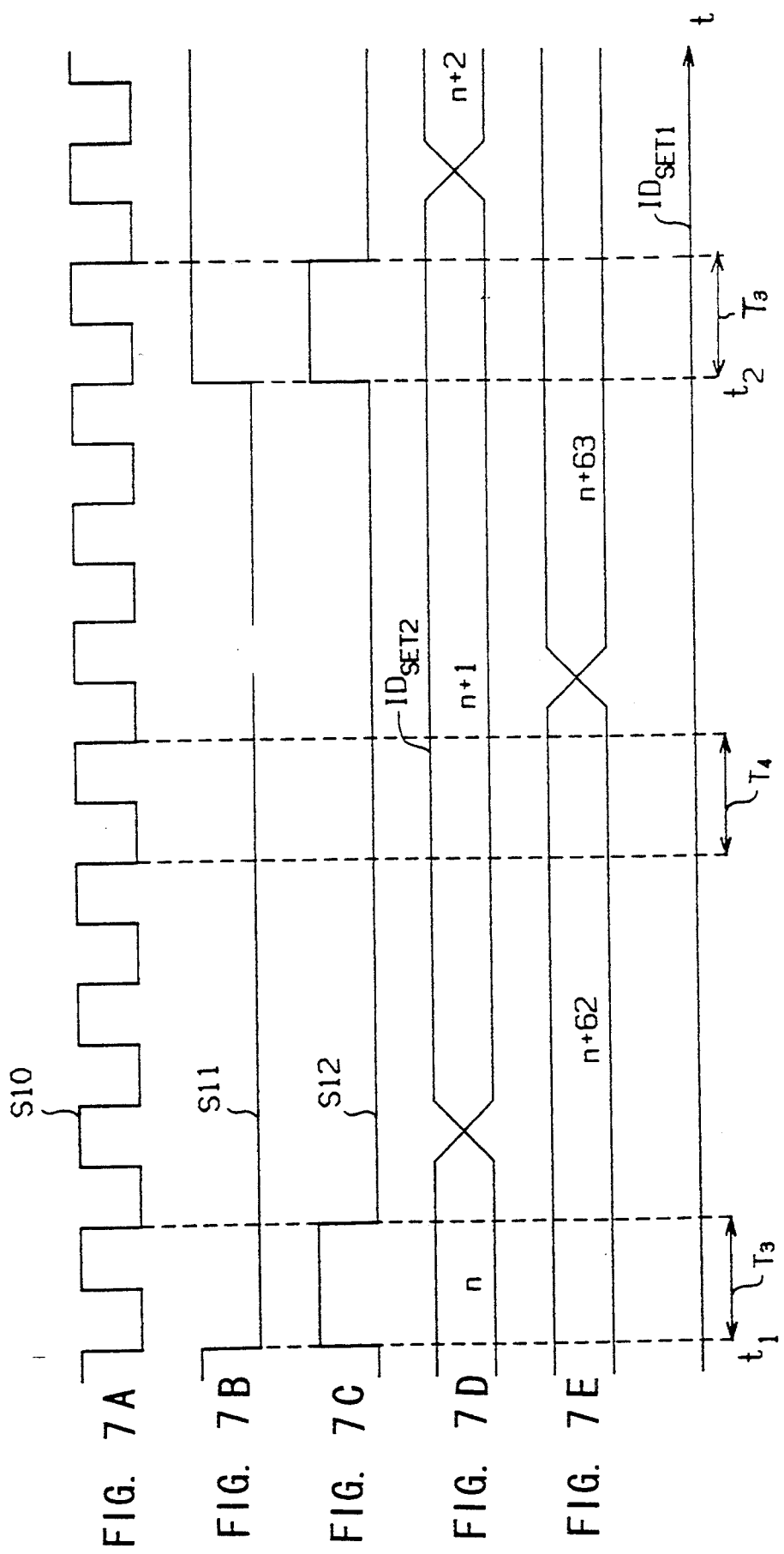
FIGS. 7A to 7E are signal waveform charts illustrating the function of a data recorder.

In this event, in the data recorder 40, the standard signal generation circuit 44 generates a 220 [Hz] standard signal S10 as shown in FIG. 7A.

Furthermore, in the data recorder 40, the magnetic head 3 which is recorded with the same format can be reproduced at a tape speed of 1-fold, $\frac{1}{2}$-fold, $\frac{1}{4}$-fold, $\frac{1}{8}$-fold, 1/16-fold, and 1/24-fold and at this point, the frequency of a drum standard signal S11 generated from the standard signal generation circuit 44 changes by 1, $\frac{1}{2}$, $\frac{1}{4}$, $\frac{1}{8}$, 1/16, and 1/24-fold.

Thus, since frequency of drum standard signal S11 changes by 1, $\frac{1}{2}$, $\frac{1}{4}$, $\frac{1}{8}$, 1/16, and e,fra 1/24-fold, the resulting detection delay of reproducing signal S9 and reproducing control signal S8 by the reproducing signal processing circuit 50 and the ID reader circuit 47 is 1, 2, 4, 8, ... -fold.

At this point, the data recorder 40 compares the track set number information $ID_{SET1}$ on the data tracks TR and the track set number information $ID_{SET2}$ on the control track CTL keeping the phase relation with respect to the drum standard signal S11 constant, and thus, in the case where the reproduction speed changes, the same value can be obtained as the difference between the track set number information $ID_{SET1}$ and $ID_{SET2}$.

More specifically, in the case where track set number information $ID_{SET1}$ and $ID_{SET2}$ are compared regardless of reproduction speed, since there is the possibility that 2 kinds of values, "61" ID or "62" ID, may be obtained as the difference between the track set number information $ID_{SET1}$ and $ID_{SET2}$, in the data recorder 40 as shown in FIGS. 7A to 7E, the standard signal generation circuit 44 generates a comparison processing control signal S12 which rises for a cycle of standard signal S10 from the time point $t_1$ at which time the drum standard signal S11 falls, or its rising time point $t_2$, and compares track set number information $ID_{SET1}$ and $ID_{SET2}$ for a period $T_3$ during which period the comparison processing control signal S12 is risen.

As a result, in the data recorder 40, since the track set number information $ID_{SET1}$ and $ID_{SET2}$ are compared based on the comparison processing control signal S12 synchronized with the drum standard signal S11, the same value corresponding to the position shift of the control head 5 can be obtained as the comparison result of track set number information $ID_{SET1}$ and $ID_{SET2}$ even in the case where reproduction speed changes or the number of heads differs according to the type of devices.

Figure 8:
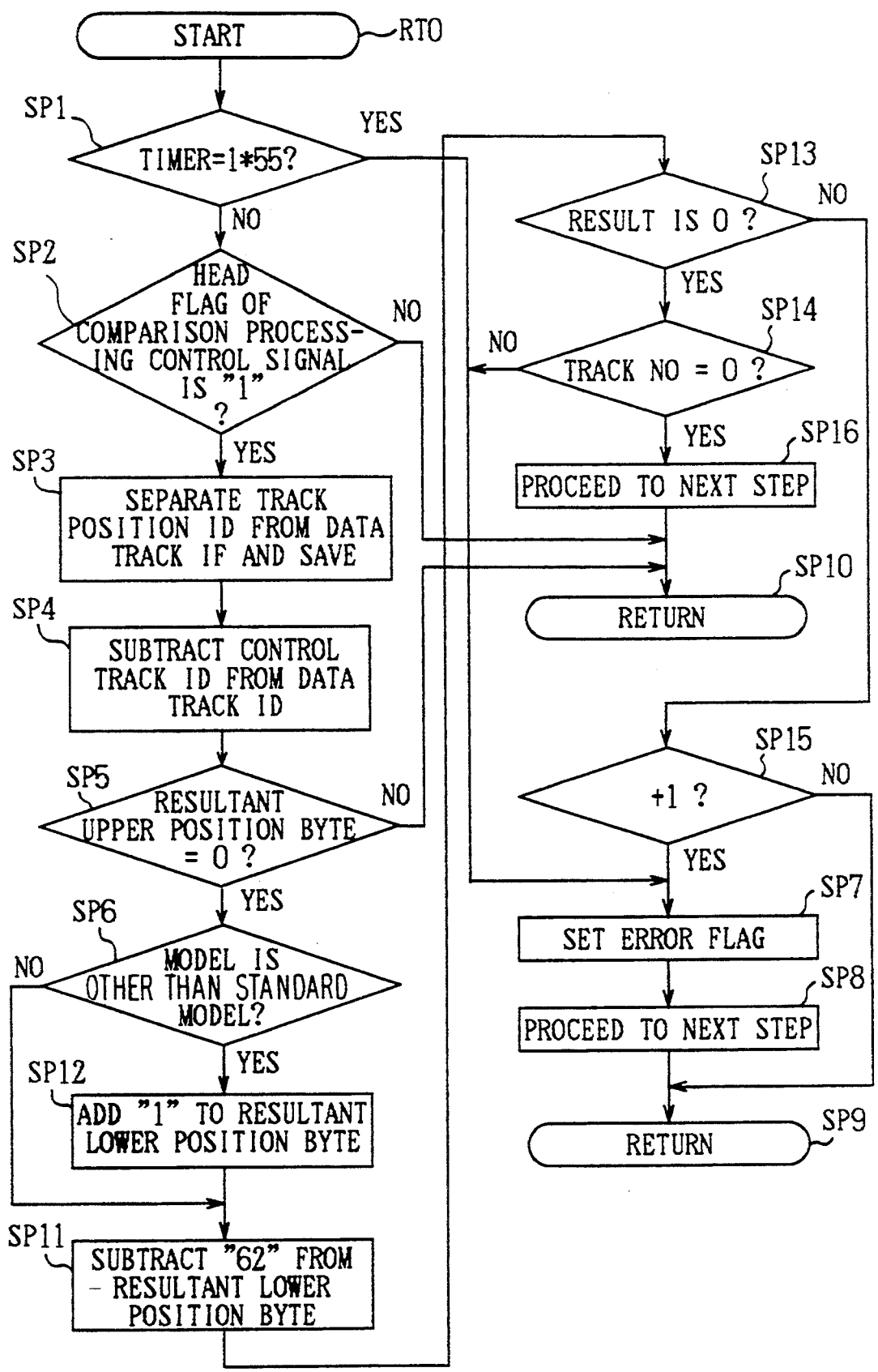
FIG. 8 is a flow chart illustrating the function of timer interruption processing.

More specifically, as shown in FIG. 8, the second CPU 49 is arranged to detect the position of the control head 5 by performing a timer interruption processing routine to be called out 55 times a second when the timer interruption starts.

More particularly, when CPU 49 enters the interruption processing routine at RT0, it judges whether the timer is 55 or not at the step SP1.

At this point, if a negative result is obtained, CPU 49 proceeds to the step SP2 and judges whether the head flag of comparison processing control signal S12 is "1" or not (i.e., comparison processing control signal S12 is rising or not) and in this event if an affirmative result is obtained, CPU 49 proceeds to the step SP3 and separates the track number information $ID_{TR}$ from the track number information $ID_{TR}$ and track set number information $ID_{SET1}$ which are recorded on the data tracks TR as data track discrimination data $ID_{DATA1}$ (FIGS. 3A and 3C), and memorizes the track number information $ID_{TR}$.

Furthermore, at the step SP4, CPU 49 subtracts the track set number information $ID_{SET2}$ obtained by the control head 5 from the track set number information $ID_{SET1}$ obtained by the rotary drum 2.

Then, at the step SP5, CPU 49 judges whether the upper position byte of the calculation result at the step SP4 is "0" or not, and if an affirmative result is obtained, proceeds to the step SP6.

On the other hand, if a negative result is obtained at the step SP5, this means that the data is completely different from the data of the track set number information $ID_{SET1}$ and $ID_{SET2}$ which the data recorder is aiming at, is read out, and at this point, CPU 49 proceeds to the step SP10 and returns to the main routine.

In the same manner, if a negative result is obtained at the step SP2, CPU 49 proceeds to the step SP10 and returns to the main routine.

At this point, since negative results are obtained at the step SP2 and the step SP5, CPU 49 proceeds to the step SP10 and returns once to the main routine and then, returns again to RT0 and performs the interruption processing routine.

In this event, when this sort of processing is performed 55 times a second, CPU 49 detects that the timer becomes 55 at the step SP1 and at this point, CPU 49 judges that comparison processing control signal S12 has not been detected at all in the period of one second, or track set number information $ID_{SET1}$ and $ID_{SET2}$ having completely different values are read out, and CPU 49 proceeds to the step SP7. Then, after setting an error flag at the step SP7, CPU 49 sets a command for the main routine to terminate the interruption processing routine and proceeds to the next step at step SP8, and returns to the main routine at the step SP9.

On the other hand, if an affirmative result is obtained at the step SP5, CPU 49 proceeds to the step SP6 and judges whether the data recorder 40 is a model other than than standard model, and if the data recorder 40 is a standard model, proceeds to the step SP11.

On the other hand, if CPU 49 judges at the step SP6 that than the data recorder is the model other than standard model, CP49 proceeds to the step SP11 after adding 1 to the lower position byte of the calculation result wherein track set number information $ID_{SET2}$ is subtracted from track set number information $ID_{SET1}$ at the step SP12 considering that signal processing of this data recorder is delayed for "1" ID as compared with the signal processing of the standard model. In this connection, in this type of data recorder, data to show the type of the data recorder is written in the prescribed random access memory (RAM) and CPU 49 discriminates the type of data recorder based on this data.

At this point, at the step SP11, CPU 49 performs calculation processing to subtract "62" from the lower position byte of the calculation result of the step SP4 and step SP12.

Then, at the step SP13, CPU 49 judges whether the calculation result at the step SP11 is "0" or not.

At this point, in the data recorder 40, the prescribed rotary head traces the data track TR0 in data tracks TR described above in FIGS. 2A and 2B, for a period $T_3$ from the point where drum standard signal S11 rises or falls, $t_1$ or $t_2$, and thus, the data recorder 40 compares the track set number information $ID_{SET1}$ (FIGS. 3A to 3C) and the track set number information $ID_{SET2}$ (FIGS. 2A and 2B) during a period $T_3$ in which the rotary head is tracing the data track TR0.

Here, in the case of data recorder 40, an adjustment field is for "$\frac{1}{4}$" ID in the direction closer to or farther from the rotary drum 2 respectively and accordingly, there are cases where the control head 5 shifts within this field.

Thus, in the data recorder 40, there are cases where the rotary head traces the data track TR2 (since the data track TR is azimuth recorded, data tracks TR1 and TR3 are never traced).

Figure 1:
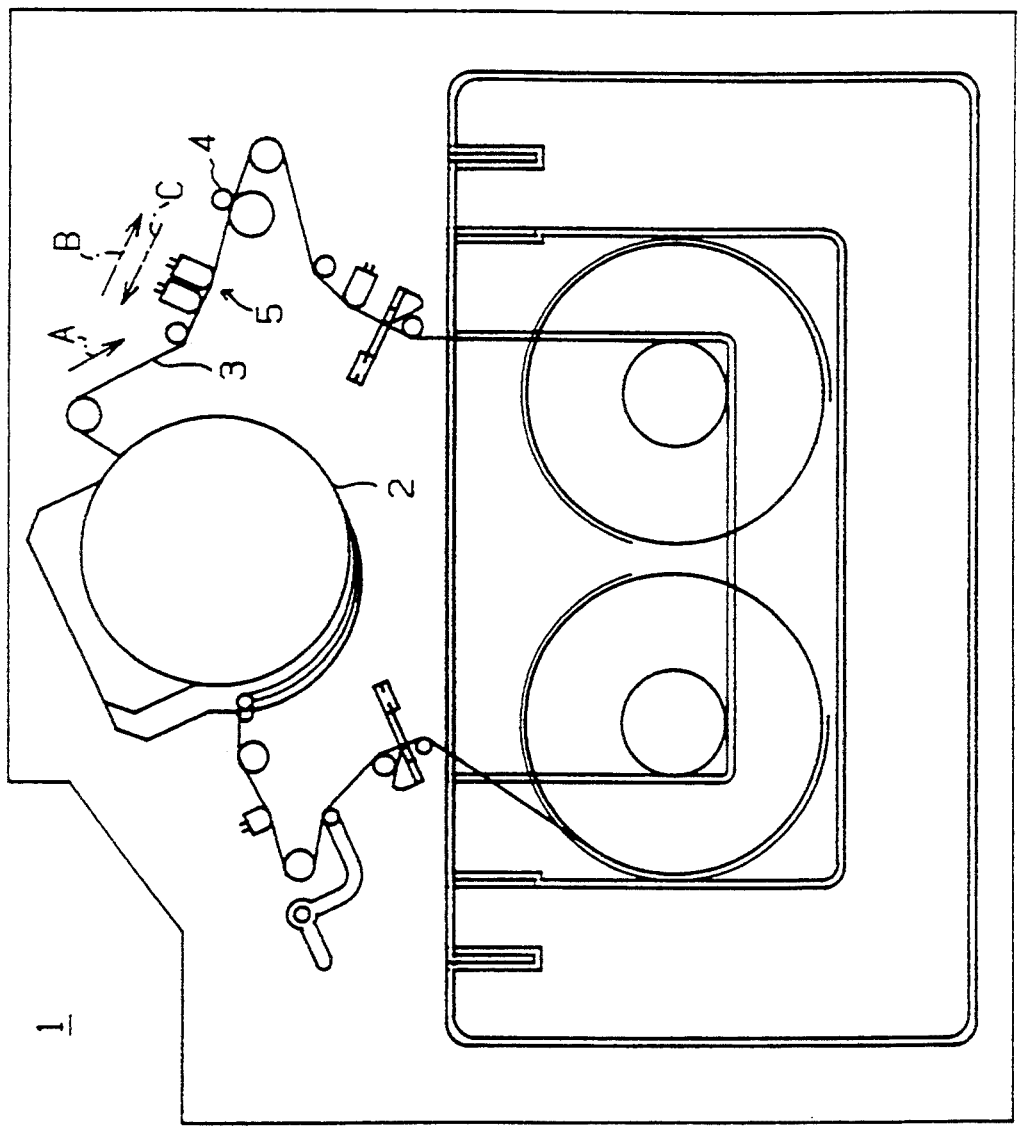
FIG. 1 is a schematic diagram showing an exterior construction of a data recorder of the related art.
Figures 2A, 2B:
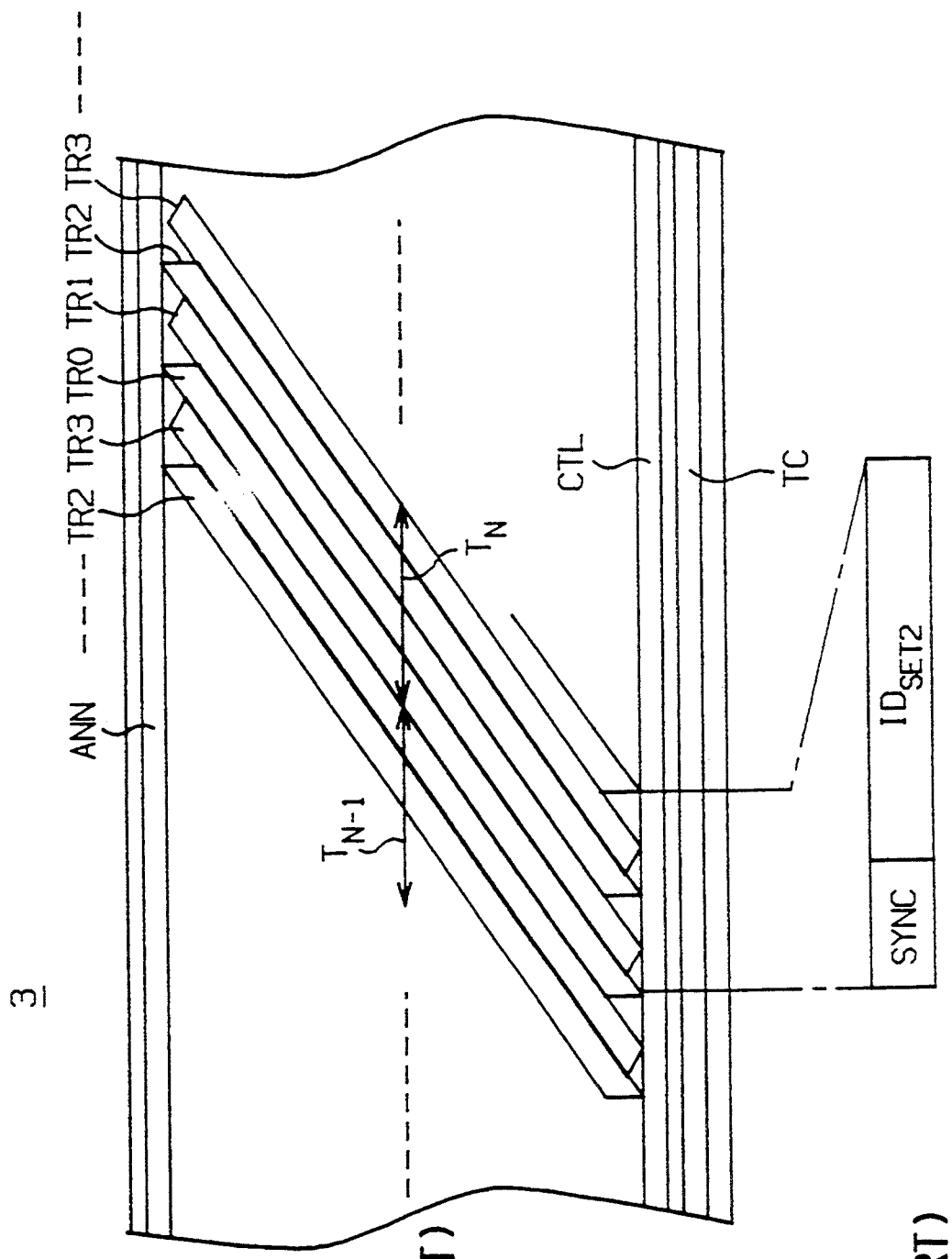
FIGS. 2A and 2B are schematic diagrams illustrating a recording pattern of ID-1 format.

Here, in the case where the control head 5 shifts for "$\frac{1}{4}$" ID in the direction closer to the rotary drum 2 (in the direction of "C" in FIG. 1), the prescribed rotary head is supposed to trace the data track TR0 of track set $T_N$ in FIGS. 2A and 2B, instead, it traces the data track TR2 of track set $T_{N-1}$, and at this point, the difference between the track set information $ID_{SET1}$ and the track set number information $ID_{SET2}$ becomes "61" ID.

On the other hand, in the case where the control head 5 shifts for "$\frac{1}{4}$" ID in the direction farther from the rotary drum 2 (in the direction of "B" in FIG. 1), the prescribed rotary head is supposed to trace the data track TR0 of track set $T_N$ in FIGS. 2A and 2B, instead it traces data track TR2 of track set $T_N$. And at this point, in the data recorder 40, since the track set number information $ID_{SET1}$ and $ID_{SET2}$ are counted up every 1 track set (i.e., per 4 data tracks) the difference between the track set number information $ID_{SET1}$ and the track set number information $ID_{SET2}$ is "62" ID, the same as in the case where the control head 5 is arranged at the correct position.

With this arrangement, in the data recorder 40, in the case where the difference between the track set number information $ID_{SET1}$ and the track set number information $ID_{SET2}$ is calculated, the calculation result is "62" ID and then, it detects whether the rotary head is tracing the data track TR0 or the data track TR2 based on the track number information $ID_{TR}$, And at this point, in the case where the rotary head is tracing the data track TR0, it is judged that the control head 5 is on the correct position. On the other hand, in the case where the rotary head is tracing the data track TR2, it is judged that the control head 5 shifted in the direction farther from the rotary drum 2 (in the direction of "B" in FIGS. 2A and 2B) for "$\frac{1}{4}$" ID.

Accordingly, if an affirmative result is obtained at the step SP13, this means that the control head 5 is on the correct position, or the control head 5 is shifted in the direction farther from the rotary drum 2 for "$\frac{1}{4}$" ID (2 tracks of the data tracks TR), CPU 49 proceeds to the step SP14.

At the step SP14, CPU 49 judges whether the prescribed rotary head is tracing the data track TR0 based on the track number information $ID_{TR}$ memorized at the step SP3 or not. And at this point if an affirmative result is obtained, CPU 49 proceeds to the step SP16 and delivers information that the control head 5 is arranged on the correct position to the main routine and simultaneously, after delivering an order to terminate the interruption processing routine and proceed to the next step to the main routine, it returns to the main routine at the step SP10. Since this judgment result is given to the main program of the self diagnosis system, the user can obtain the diagnosis message that the control head 5 is at the correct position.

On the other hand, if a negative result is obtained at the step SP14, this means that the prescribed rotary head is tracing the data track TR2 of the track set $T_N$, the CPU 49 proceeds to the step SP7 and after setting the information that the control head 5 is shifted in the direction farther from the rotary drum 2 for "$\frac{1}{2}$" ID in the error flag, sets an order for the main routine to terminate the interruption processing routine and proceeds to the next step at the step SP8 and returns to the main routine at the step SP9. Since this judgment result is handed over to the main program of the the self diagnosis system, the user can get a message that the control head 5 is shifted in the direction farther from the rotary drum 2 for "$\frac{1}{2}$" ID.

Furthermore, if a negative result is obtained at the step SP13, this means that the control head 5 is shifted for "$\frac{1}{2}$" ID in the direction closer to the rotary drum 2 from the correct position (in the direction of "C" in FIG. 1) or the tracking shifts, at this point, the CPU 49 proceeds to the step SP15.

The CPU 49 judges whether the calculation result at the step SP11 is "1" ID or at the step SP15, and if an affirmative result is obtained at this point, this means that the control head 5 shifts for "$\frac{1}{2}$" ID from the correct position in the direction closer to the rotary drum 2 and at this point, the CPU 49 proceeds to the step SP7, and after setting information that the control head 5 shifts for "$\frac{1}{2}$" ID in the direction closer to the rotary drum 2 in the error flag, sets an order that the main routine finishes the interruption processing routine and proceeds to the next step at the step SP8, and returns to the main routine at the step SP9.

On the other hand, if a negative result is obtained at the step SP15, the CPU 49 judges that the tracking shift occurs in the rotary head or control head 5 and proceeds to the step SP9 and returns to the main routine once, and then returns to the RT0 and performs the interruption processing routine.

With this arrangement, in the data recorder 40, in the case where the CPU 49 detects that the control head 5 is arranged at the correct position or is shifted for "$\frac{1}{2}$" × ID in the direction farther from the rotary drum 2 or is shifted for "$\frac{1}{2}$" ID in the direction closer to the rotary drum 2, the message is generated corresponding to the detected result and displayed on the prescribed display device 55 to inform the user and thus, the user can easily confirm the position shift of the control head 5.

In accordance with the foregoing construction, when a self diagnosis starter button is operated, the data recorder 40 enters self diagnosis mode and generates comparison processing control signal S12 which rises for the prescribed period $T_3$ from the time point where the drum standard signal S11 rises or falls, $t_2$ or $t_1$, in synchronism with the drum standard signal S11.

The data recorder 40 compares the difference between the track set number information $ID_{SET1}$ of the data tracks TR and the track set number information $ID_{SET2}$ of the control track CTL for a period $T_3$ when the comparison processing control signal S12 is risen.

At this point, in the case where the difference between the track set number information $ID_{SET1}$ and the track set number information $ID_{SET2}$ is "62" ID, the data recorder 40 diagnoses that the control head 5 is arranged at the correct position or it is shifted for "$\frac{1}{2}$" ID in the direction farther from the rotary drum 2.

At this point, the data recorder 40 detects whether the prescribed rotary head is tracing the data track TR0 or the data track TR2 based on the track number information $ID_{TR}$ recorded on the data track TR, and in the case where the detection result is the data track TR0, the data recorder 40 diagnoses that the control head 5 is arranged on the correct position. On the other hand, in the case where the detection result is the data track TR2, the data recorder 40 diagnoses that the control head 5 shifts for "$\frac{1}{2}$" ID in the direction farther from the rotary drum 2.

Moreover, in the case where the difference between the track set number information $ID_{SET1}$ and the track set number information $ID_{SET2}$ is "61" ID, it diagnoses that the control head 5 shifts for "$\frac{1}{2}$" ID in the direction closer to the rotary drum 2.

The data recorder 40 displays these diagnostic results on the prescribed display device and thus, the user can easily confirm that the control head 5 is shifted in which direction and how far.

With this arrangement, if the user adjusts the position of the control head 5 based on the diagnostic result, the position shift of the control head 5 can be easily corrected.

In accordance with the foregoing construction, since the position of the control head 5 is detected based on the difference between the track set number information $ID_{SET1}$ recorded on the data track TR and the track set number information $ID_{SET2}$ recorded on the control track CTL, the position shift of the control head 5 can be easily confirmed by a self diagnosis function without using special standard tapes or special measuring devices, such as an oscilloscope.

Since the self diagnosis described above is conducted in synchronism with drum standard signal S11, the position shift of the control head 5 can he detected by the same CPU 49 even in the case where the number of rotary heads of the device differs or the reproduction speed changes.

Furthermore, the embodiment described above has dealt with the case of detecting the position shift of the control head 5 in utilizing the track number information $ID_{TR}$ of the data tracks TR. However, this invention is not only limited to this, but also the comparison timing is changed and the execution timing of the self diagnosis routine itself is changed by controlling the capstan motor 45 by capstan control unit 46, i.e. shifting the tracking (the phase of the reproducing control signal S8 for the standard signal S10), and the position shift of the control head 5 may be detected based on the difference between the track set number information $ID_{SET1}$ and the track set number information $ID_{SET2}$.

More specifically, in the timing chart as shown in FIGS. 7A to 7E, in the case where the tracking is shifted for 2 tracks or in the case where the diagnosis routine is conducted at the timing of periods $T_3$ and $T_4$, the difference between the track set number information $ID_{SET1}$ and the track set number information $ID_{SET2}$ at the time when the control head 5 shifts in the direction toward the rotary drum 2 is "61"0 ID both in the period $T_3$ and the period $T_4$. Also, in the case where the control head 5 shifts in the direction farther from the rotary drum 2, the difference becomes "62" ID both in the period $T_3$ and the period $T_4$. On the other hand, when the control head 5 is at the correct position, the difference between the track set number information $ID_{SET1}$ and the track set number information $ID_{SET2}$ is "61" ID in the period $T_3$ and "62" ID in the period $T_4$. Thus, the position of control head 5 can be found by combining these differences.

Furthermore, the embodiment described above has dealt with the case wherein the data recorder 40 self-diagnoses the position shift of the control head 5. However, in addition to this, if the self diagnosing function to diagnose the rotating phase shift of the rotary drum 2 is provided, the rotating phase shift of the rotary drum 2 may be detected as well as the position shift of the control head 5.

In this case, once it is confirmed that the rotary head on the rotary drum 2 is tracing the correct track, the data recorder conducts an auto tracking function based on the output amplitude of the reproducing signal S9. At this point, CPU 49 of the data recorder 40 judges if the phase shift between the edge unit of the synchronizing signal SYNC (FIGS. 2A and 2B) and the servo reference signal S3 in the reproducing control signal S8 at the maximum point of the output amplitude of the reproducing signal S9 exceeds the standard value. Then, CPU 49 judges if the drum rotating phase for the servo reference signal S3 is within the standard value in utilizing the phase difference between synchronizing code $SYNC_{PR}$ (FIGS. 3A to 3C) of the preamble unit PR on the data tracks TR and the servo reference signal S3. Since this judgment result is handed over to the main program of the self diagnosis system, the user may obtain rotating phase information of the rotary drum 2 as well as the position information of the control head 5 as diagnostic message.

Figure 9:
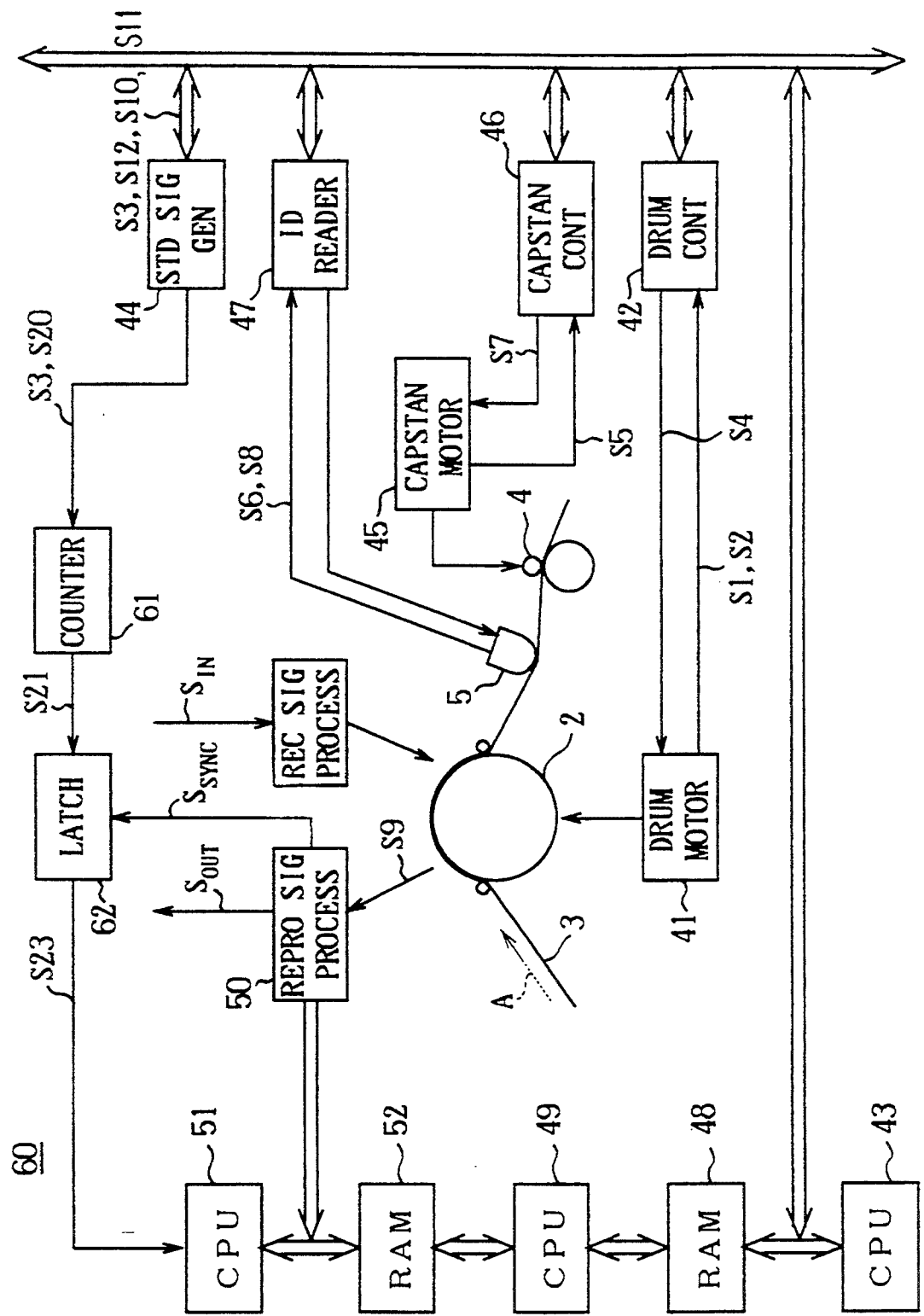
FIG. 9 is a block diagram showing the other embodiment of a data recorder.

More specifically, as shown in FIG. 9, this data recorder 60 inputs a clock signal S20 from the standard signal generation circuit 44 to the counter 61. At this point, the counter 61 counts the clock signal S20 by resetting at the time when the servo reference signal S3 is inputted from the standard signal generation circuit 44, and outputs the count value to the latch circuit 62 as output signal S21. The latch circuit 62 latches the above count value for the period until the synchronizing signal $S_{SYNC}$ from the synchronizing signal detector of the reproducing signal processing circuit 50 is inputted, and outputs output signal S23 composed of the count value until the synchronizing signal $S_{SYNC}$ is inputted to the CPU 51. Since the CPU 51 outputs this count value to the CPU 49 via RAM 52, the CPU 49 can detect the rotating phase shift of the rotary drum 2 based on the count value.

Furthermore, the embodiment described above has dealt with the case of obtaining the difference between the track set number information $ID_{SET1}$ and the track set number information $ID_{SET2}$ at the timing in synchronism with the drum standard signal S11. However, this invention is not only limited to this, but the track set number information $ID_{SET1}$ and the track set number information $ID_{SET2}$ may be compared at the timing in synchronism with the prescribed standard signal which changes corresponding to the number and reproducing speed of the rotary heads loaded on the rotary drum 2 as well.

Furthermore, the embodiment described above has dealt with the case of reproducing the magnetic tape 3 recorded with ID-1 format by the data recorder 40. However, this invention is not only limited to this, but may be applied to the data reproducing device for reproducing data recorded on optical tape for example. That is, this invention may be widely applied to various data reproducing devices in which data track discrimination information is recorded on the helically formed data tracks TR and which utilize recording tape on which discrimination information is recorded corresponding to the data track discrimination information formed on the control track CTL in a longitudinal direction.

While preferred embodiments of the invention have been considered it will be obvious to those skilled in the art that various changes and modifications may be aimed, therefore, to cover in the appended claims all such changes and modifications as fall within the true spirit and scope of the invention.

What is claimed is:

1. A data reproducing apparatus for reproducing data from a tape-shaped recording medium on which a plurality of recording tracks are formed including a first recording track formed in an inclined direction and a second recording track formed in a longitudinal direction, and wherein a first position information to discriminate said recording tracks is recorded on said first track and a second position information corresponding to said first position information is recorded on said second recording track, the apparatus comprising:
   a rotary head for reproducing a first data from said first recording track formed on said recording medium;
   first detection means for detecting said first position information from the reproduced first data;
   a control head for reproducing a second data from said second recording track formed on said recording medium;
   second detection means for detecting said second position information from the reproduced second data; and
   third detection means for detecting a position of said control head in accordance with a difference between the detected first position information and the detected second position information.

2. A data reproducing apparatus according to claim 1, wherein,
   said first position information comprises first track set number information formed on said first recording track, and said second position information comprises second track set number information formed on said second recording track.

3. A data reproducing apparatus according to claim 1, further comprising:
   means for generating reference signals; and means for generating control signals in synchronization with said reference signals, wherein:
   the difference between the detected first position information and the detected second position information is detected by said third detection means in accordance with said generated control signals.

4. A data reproducing apparatus according to claim 1, further comprising,
   indicator means for indicating a position of said control head based on the detected result of said third detection means.

5. A data reproducing apparatus according to claim 1, wherein said first detection means further detects track number information recorded in said first recording track; and further comprising means for determining whether the detected track number information is a predetermined number, wherein:

when it is determined that the difference between said first position information and said second position information is a predetermined value and said track number information is the predetermined number, the position of said control head is a predetermined position.

6. A data reproducing apparatus according to claim 1, further comprising, means for shifting tracking of said rotary head for said plurality of recorded tracks, wherein the position of said control head is detected at two timing intervals in accordance with the result detected by said third detection means.

* * * * *